Figure 7:
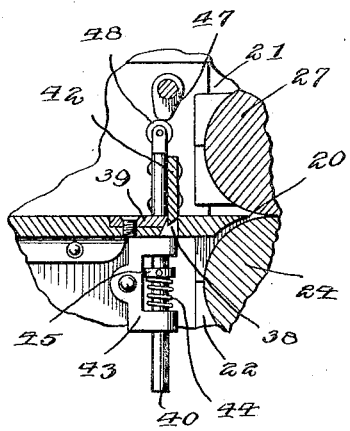

T. W. SUGGS.
SHEET METAL CUTTING MACHINE.
APPLICATION FILED FEB. 27, 1914.
1,115,347.
Patented Oct. 27, 1914.
5 SHEETS—SHEET 1.
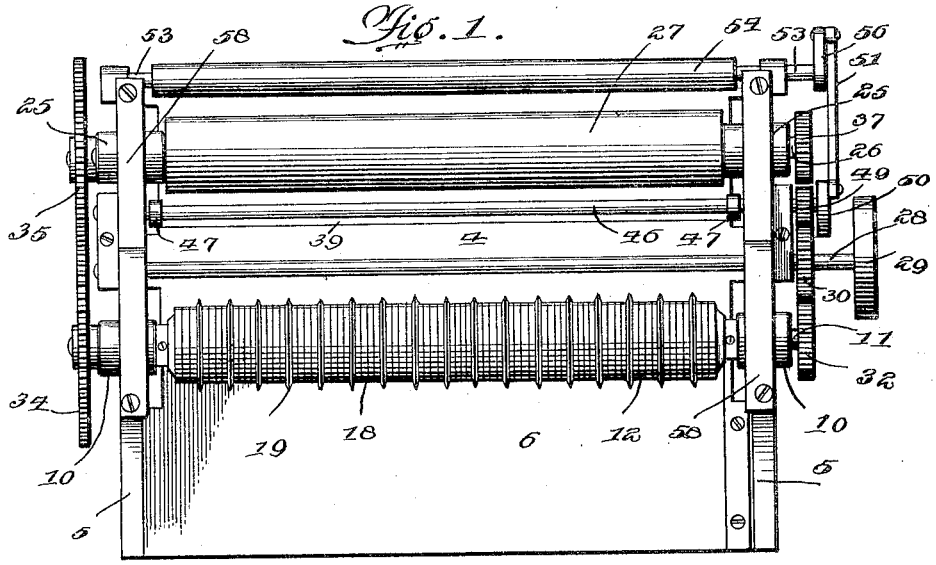
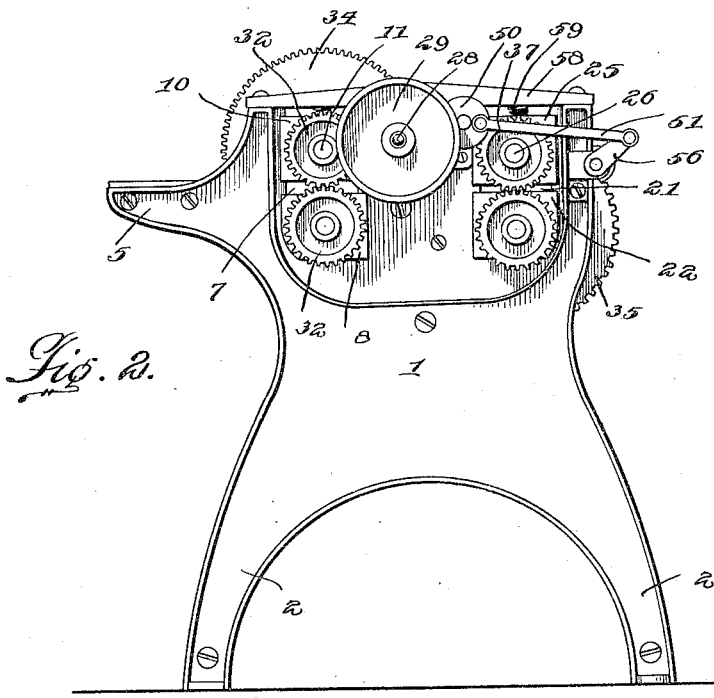
Witnesses
Frederick L. Fox
John J. McCarthy
Inventor
T. W. Suggs.
By Victor J. Evans.
Attorney T. W. SUGGS.
SHEET METAL CUTTING MACHINE.
APPLICATION FILED FEB. 27, 1914.
1,115,347.
Patented Oct. 27, 1914.
5 SHEETS—SHEET 2.
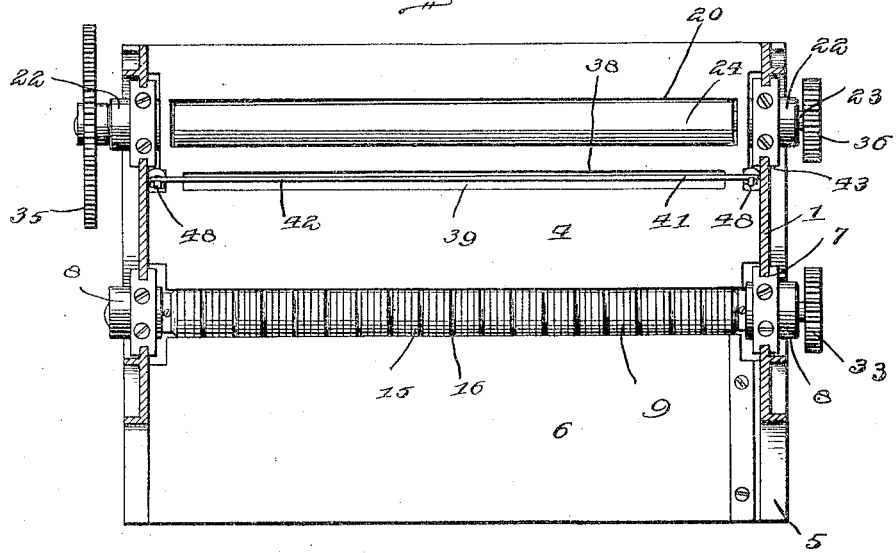
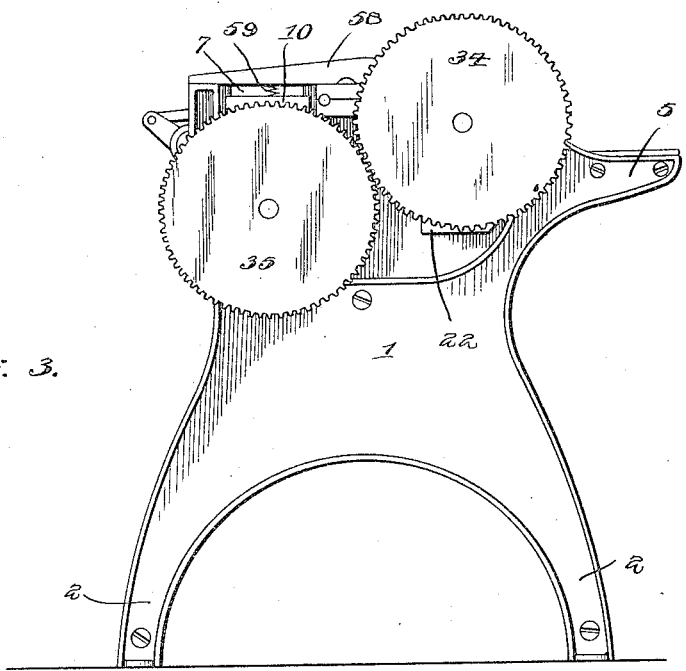
Witnesses
Frederick L. Joe.
John J. McCarthy
Inventor
T. W. Suggs.
By Victor J. Evans.
Attorney T. W. SUGGS.
SHEET METAL CUTTING MACHINE.
APPLICATION FILED FEB. 27, 1914.
1,115,347.
Patented Oct. 27, 1914.
5 SHEETS—SHEET 3.
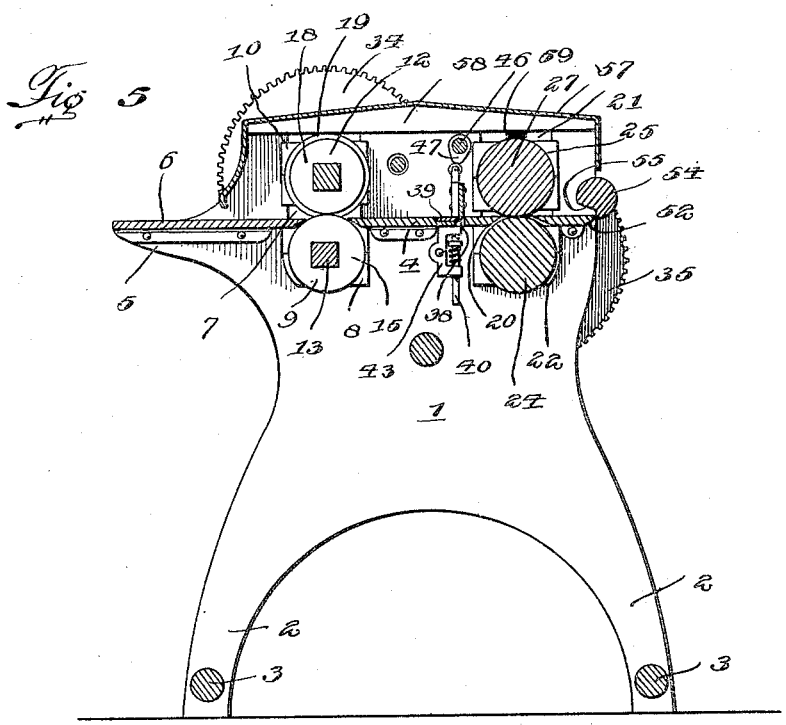
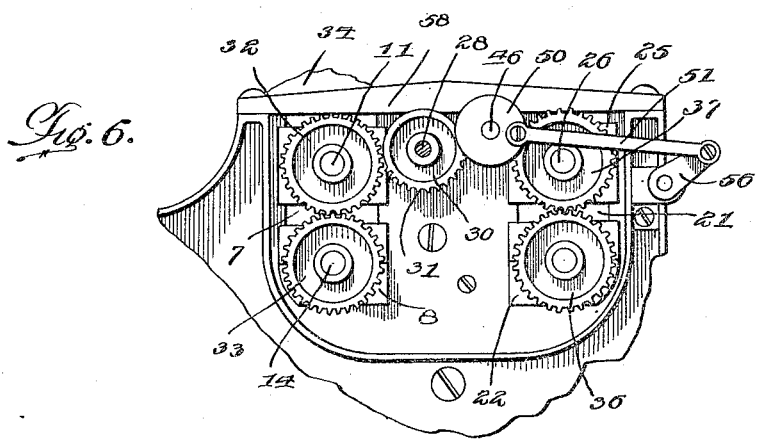
Witnesses
Frederick L. Fie.
John J. McCarthy
Inventor
T. W. Suggs.
By Victor J. Evans.
Attorney

T. W. SUGGS.
SHEET METAL CUTTING MACHINE.
APPLICATION FILED FEB. 27, 1914.

1,115,347.

Patented Oct. 27, 1914.
5 SHEETS—SHEET 4.

Witnesses
Frederick L. Fue,
John J. McCarthy

Inventor
T. W. Suggs
By Victor J. Evans.
Attorney

T. W. SUGGS.
SHEET METAL CUTTING MACHINE.
APPLICATION FILED FEB. 27, 1914.
1,115,347.
Patented Oct. 27, 1914.
5 SHEETS—SHEET 5.
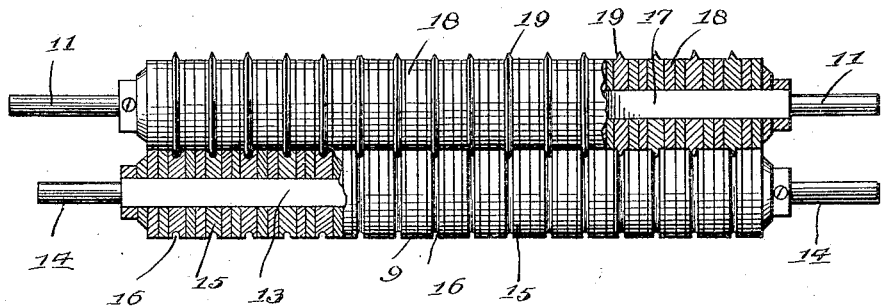
Fig. 8.
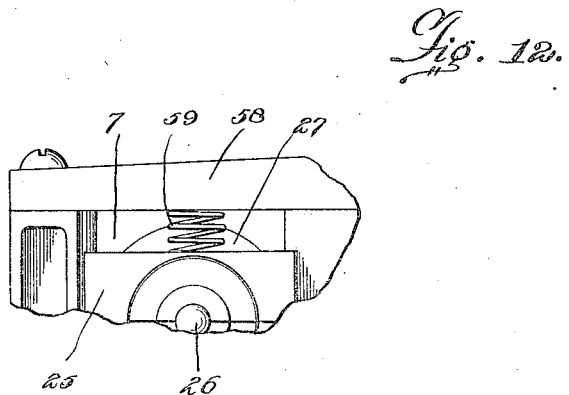
Fig. 9.
Fig. 12.
Witnesses
Frederick L. Fae.
John J. McCarthy
Inventor
T. W. Suggs.
By Victor J. Evans.
Attorney

UNITED STATES PATENT OFFICE.

THEOPHILUS W. SUGGS, OF ARBA, NORTH CAROLINA, ASSIGNOR OF ONE-HALF TO HERMAN F. HARDY, OF JASON, NORTH CAROLINA.

SHEET-METAL-CUTTING MACHINE.

1,115,347. Specification of Letters Patent. Patented Oct. 27, 1914.

Application filed February 27, 1914. Serial No. 821,504.

*To all whom it may concern:*

Be it known that I, THEOPHILUS W. SUGGS, a citizen of the United States of America, residing at Arba, in the county of Greene and State of North Carolina, have invented new and useful Improvements in Sheet-Metal-Cutting Machines, of which the following is a specification.

This invention relates to improvements in sheet metal cutting machines and has particular application to a combined cutting and forming machine.

In carrying out the present invention, it is my purpose to provide a machine of the class described whereby sheet metal such as tin and the like may be initially cut into longitudinal strips and then cut transversely to provide comparatively short strips capable of being bent to form substantially U-shaped clips.

It is also my purpose to provide a machine of the class described wherein succeeding the second cutting operation the short strips will be bent upon themselves into substantially U-form and discharged from the machine.

Furthermore, I aim to provide a sheet metal cutting machine which will embrace the desired features of simplicity, efficiency and durability, which will embody comparatively few parts and these so arranged and correlated as to reduce the possibility of derangement to a minimum and wherein the cutting and forming mechanisms will be so timed relatively to one another that while one is in action the other will be inactive, the machine being entirely automatic in operation.

With the above and other objects in view, the invention consists in the construction, combination and arrangement of parts hereinafter set forth in and falling within the scope of the claims.

Figure 10:
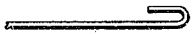
Figure 11:
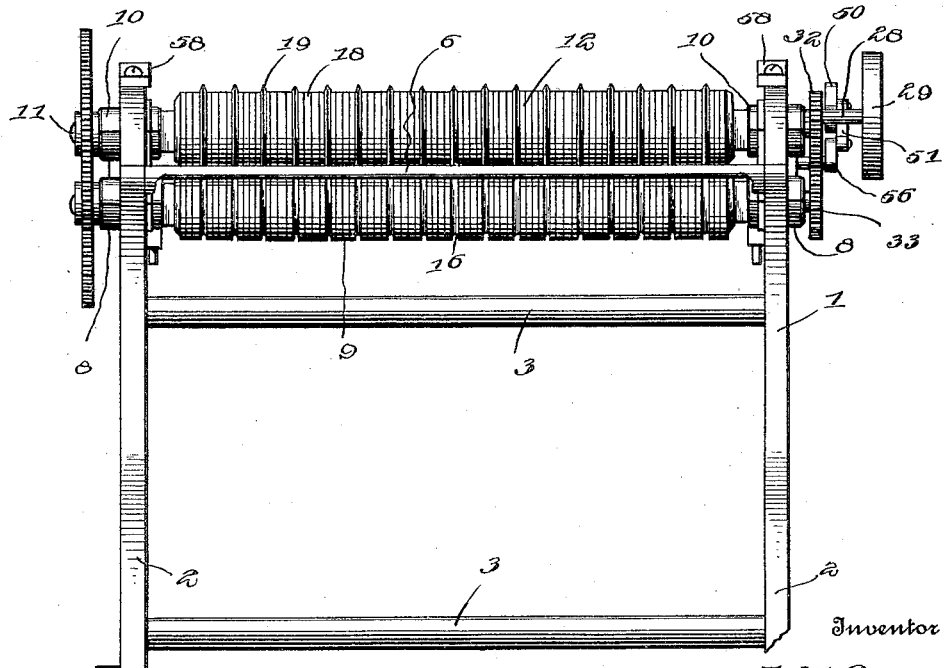

In the accompanying drawings; Figure 1 is a top plan view of a sheet metal cutting and forming machine constructed in accordance with the present invention, the cover of the machine being removed. Fig. 2 is a view in side elevation thereof. Fig. 3 is a view of the opposite side of the machine. Fig. 4 is a horizontal sectional view through the machine. Fig. 5 is a transverse sectional view therethrough. Fig. 6 is a fragmentary side elevation of the machine showing the driving mechanism on an enlarged scale. Fig. 7 is a fragmentary cross sectional view through the machine showing the mounting of one of the knives. Fig. 8 is a plan view of the cutting rollers removed from the machine, parts being shown in section. Fig. 9 is an enlarged cross sectional view through the forming roller. Fig. 10 is a view in side elevation of a product of the machine. Fig. 11 is a view in front elevation of the machine. Fig. 12 is an enlarged fragmentary side elevation showing the manner of supporting the upper rollers.

Referring now to the drawings in detail, 1, 1 designate side supporting plates each supported upon legs 2, 2, the legs of one plate being connected, at their lower ends, with the legs of the other plate, by means of tire rods 3.

4 designates a bed plate spanning the space between the side plates 1, 1 adjacent to the upper ends of the latter and having the opposite extremities thereof connected with such side plates so that the bed plate will be properly supported. Extending outwardly from one edge of each side plate 1 and adjacent to the upper end thereof is an arm 5 and disposed between the arms 5 and suitably fastened thereto and disposed in a plane coincident with that of the bed plate 4 is a feed board 6. The confronting edges of the feed board 6 and the bed plate 4 are appropriately spaced apart and the side plates 1, 1 are formed with vertical slots 7, 7 alining with each other and with the space between the feed board and the bed plate. Slidably disposed within the slots 7, 7 and resting upon the lower walls thereof are horizontally alining bearings 8, 8 capable of removal from the slots and journaled within the bearings 8, 8 is a cutting roller 9. Removably mounted within the slots 7, 7 and resting upon the bearings 8, 8 therein are horizontally alining bearings 10, 10 and journaled within the bearings 10, 10 are trunnions 11, 11 carried by the opposite ends of a cutting roller 12 surmounting the cutting roller 9 and coöperating therewith.

In the present instance, the lower roller 9 comprises a square shaft 13 having the opposite ends thereof rounded off to form trunnions 14 fitting within the bearings 8, 8. Surrounding the shaft 13 and rotatable therewith are shutters 15 placed in edge to edge contact and having the confronting edges thereof rabbeted circumferentially to form annular grooves 16. The cutting roller 12 surmounting the roller 9 and coöperating therewith comprises a square shaft 17 having the opposite ends turned to form the trunnions 11, 11 and surrounding the shaft 17 are a plurality of washers 18. Interposed between the confronting edges of the washers 18 are circular knives 19 disposed concentrically of the shaft 17 and working within the grooves 16 in the roller 9. The grooves in the roller 9 are spaced apart distances equal to the spaces between the knives 19 on the upper cutting roller. By means of this construction, it will be seen that the distances between the knifes may be varied, by varying the size of the washers, while any knife may be repaired or replaced independently of the remaining knives, the washers 15 being changed to vary the distances between the grooves 16 in accordance with the spaces between the circular knives on the upper roller.

The bed plate 4 adjacent to the rear end thereof is formed with a longitudinal slot 20, while the supporting plates 1, 1 are formed with vertical slots 21, 21 contiguous the ends of the slot 20 and opening onto the upper ends of the plates. Slidably mounted within the slots 21, 21 are horizontally alining bearings 22, 22 capable of removal from the slots and resting upon the lower walls thereof and journaled within the bearings 22, 22 are trunnions 23, 23 formed on the opposite ends of a feed roller 24 rotatable about an axis below the slot 21 and having the periphery thereof rotating within such slot. Surmounting the bearings 22, 22 within the slots 21, 21 and capable of removal from the latter are horizontally alining bearings 25, 25 and journaled in the bearings 25, 25 are trunnions 26, 26 carried by the opposite ends of a feed roller 27 surmounting the roller 24 and having the periphery thereof in engagement with the periphery of the last-mentioned roller and coöperating therewith for feeding purposes. In this embodiment of my invention, the cutting rollers 9 and 12 and the feed rollers 24 and 27 are operated simultaneously and the driving mechanism therefor comprises a main drive shaft 28 journaled in horizonally alining bearings carried by the upper ends of the side plates 1, 1 between the upper cutting and feed rollers. Fast upon one end of the drive shaft is a belt pulley 29 adapted to be belted up to an engine or other prime mover whereby the drive shaft may be rotated, while keyed upon such shaft adjacent to the belt pulley is a gear 30 having teeth 31 formed on one half the periphery thereof and the remaining portion of the periphery blank. The teeth 31 on the gear 30 are adapted to mesh with the teeth of a pinion 32 fast upon the outer end of the adjacent trunnion of the upper cutting roller and meshing with a pinion 33 fast upon the outer end of the adjacent trunnion of the lower cutting roller. Thus, it will be seen that when the teeth of the gear 30 engage the teeth of the pinion 32 in the rotation of the drive shaft, the pinions 32 and 33 will be revolved with the effect to rotate the cutting rollers 9 and 12. Upon the outer end of the remaining trunnion of the upper cutting roller 9 is keyed a gear wheel 34 meshing with a similar wheel 35 fast upon the outer end of the adjacent trunnion of the lower feed roller 24, while keyed upon the outer end of the other trunnion of the lower feed roller is a pinion 36 meshing with a pinion 37 fast upon the adjacent trunnion of the upper feed roller 27. In the rotation of the cutting rollers under the action of the drive shaft the gear wheel 34 meshing with the gear 35 revolves the lower feed roller 24 in the same direction as the direction of rotation of the lower cutting roller, while the pinions 36 and 37 rotate the upper feed roller 27 in a direction similar to that of the upper cutting roller 12.

The bed plate, in advance of the slot 20, is formed with a relatively narrow slot 38 terminating short of the opposite side edges of the bed plate and detachably connected with one wall of the slot 38 is a knife blade 39, while slidably mounted within bearings located at the opposite ends of the slot 38 are vertical rods 40 to which are connected the opposite ends of a knife bar 41 arranged above the blade 39 in parallelism therewith and having detachably connected thereto a knife blade 42 coöperating with the blade 39. The lower ends of the rods 40, 40 are slidably mounted within abutment blocks 43 carried by the inner faces of the side plates 1, 1 and encircling each rod 40 is a coiled expansion spring 44 having the upper end thereof engaging a collar 45 surrounding the rod 40 and fixed thereto and the lower extremity in engagement with the upper surface of the abutment block 43, such springs acting to hold the rods 40 upwardly and the bar 41 carrying the blade 42 normally elevated. Journaled in horizontally alining bearings carried by the upper ends of the side plates 1, 1 and lying parallel with the drive shaft 28 is a countershaft 46 and fixed upon the countershaft above the upper ends of the rods 40 are cams 47 adapted in the rotation of the countershaft to engage rollers 48 journaled upon axles carried by the upper extremities of the rods 40. As the cams engage the rollers 48 in the rotation of the countershaft the rods 40 are forced downwardly against the action of the springs 44 thereby lowering the knife blade 42 into engagement with the blade 39 to produce a cutting or shearing action. Fixed upon the end of the countershaft adjacent to the gear 30 is a pinion 49 adapted to be engaged by the teeth of the gear 30 in the rotation of the latter under the action of the drive shaft, while fast upon the end of the countershaft in proximity to the pinion 49 is a crank wheel 50 and connected with the crank pin on such wheel is one end of a connecting rod 51. The rear edge of the bed plate 4 is rounded as at 52 and journaled in horizontally alining bearings carried by the rear edges of the side plates 1, 1 immediately above the rear end of the bed plate are trunnions 53, 53 on one end of a forming roller 54. This forming roller is comparatively small and has the periphery thereof cut out longitudinally to form a substantially L-shaped groove 55 adapted, when the roller is rocked in one direction, to engage the rounded edge of the bed plate and disengage such edge when the roller is rocked in the opposite direction. Fast upon the outer end of one of the trunnions is a rocker arm 56 having the outer end thereof pivotally connected with the adjacent extremity of the connecting rod 51.

After the teeth 31 on the gear 30 disengage the teeth of the pinion 32 on the upper cutting roller, such teeth engage the pinion 49 on the countershaft 46 and previous to the teeth of the gear 30 disengaging the teeth of the pinion 49 the latter and the countershaft are rotated through one complete revolution. In the rotation of the countershaft the cams thereon actuate the movable knife blade 42 to engage the stationary knife blade and so produce a cutting action, while in the first half revolution of the countershaft the connecting rod 51 and the rocker arm 56 revolve the forming roller through one quarter of a revolution with the effect to engage the L-shaped groove 55 with the rounded edge 52 of the bed plate. In the second half revolution of the countershaft the forming roller, through the medium of the connecting rod and rocker arm, is revolved through one quarter revolution in the opposite direction thereby disengaging the walls of the groove 55 from the rounded edge 52 of the bed plate.

In practice, a sheet of tin or other metal is fed from the feed board 6 between the cutting rollers and the latter and the feed rollers revolve under the action of the drive shaft. In the rotation of the cutting rollers the circular knives cut the metal into longitudinal strips and these strips pass between the knife blades 39 and 42, the feed rollers 27 and 24, and the forming roller 54 and the adjacent edge of the bed plate. As the ends of the strips pass beyond the forming roller the teeth of the gear 30 disengage those of the pinion 32 thereby rendering the cutting and feed rollers stationary and such teeth engage the teeth of the pinion 49 with the effect to rotate the countershaft 46. In the rotation of the countershaft 46 the cams thereon engage the upper ends of the rods carrying the knife bar and slide the latter downwardly whereby the knife thereon acts upon the strips of metal in conjunction with the blade 39 to cut such strips transversely. Simultaneously with the cutting of the strips into short lengths the forming roller is rocked and the walls of the L-shaped groove 55 act upon the strips with the result that the outer ends of the latter are bent under the feed board and into engagement therewith, thus bending the strips into substantially U-form to provide clips, as shown in Fig. 10. The cutting rollers, feed rollers and the cutting knives are preferably inclosed by a suitable cover 57 secured to the framework of the machine in some suitable manner. In the present instance, bars 58, 58 are suitably fastened to the upper edges of the side plates 1, 1 and serve to close the upper ends of the slots containing the bearings for the cutting and feed rollers and interposed between the under surfaces of the bars and the upper edges of the bearings carrying the upper cutting and feed rollers are coiled expansion springs 59 serving to permit upward movement of the upper cutting and feed rollers when conditions warrant. Succeeding the bending of the strips as just described, the cutting and feed rollers are again actuated and in the operation of the feed rollers the clips are thrown from the rear end of the feed board.

From the foregoing description taken in connection with the accompanying drawings, the construction and mode of operation of my improved cutting and forming machine will be readily apparent. It will be seen that I have provided a sheet metal cutting and forming machine whereby sheet metal may be cut into strips and the strips subsequently cut into short lengths and then given the desired shape.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a sheet metal cutting machine, means for cutting the metal into longitudinal strips, means for subsequently cutting said strips transversely, means for forming said strips succeeding the last cutting operation, feeding means for feeding the strips to said forming means, and means for operating said first cutting means and feeding means simultaneously and then operating said second cutting means and forming means and rendering said first cutting means and feeding means inactive.

2. In a sheet metal cutting machine, means for cutting the metal into longitudinal strips, a reciprocatory knife for subsequently cutting said strips transversely, rods supporting said knife, springs encircling said rods and acting to hold the knife normally in inactive position, cams adapted to actuate said rods to move the knife to active position against the action of said springs, and means for actuating said first means and said cams.

3. In a sheet metal cutting machine, means for cutting the metal into longitudinal strips, a reciprocatory knife for subsequently cutting said strips transversely, rods supporting said knife, springs encircling said rods and acting to hold the knife normally in inactive position, cams adapted to actuate said rods to move the knife to active position against the action of said springs, means for forming said strips succeeding the last cutting operation, feeding means for feeding the strips to said forming means, and means for operating said first cutting means and feeding means simultaneously and then operating said cams and forming means and rendering said first cutting means and feeding means inactive.

In testimony whereof I affix my signature in presence of two witnesses.

THEOPHILUS W. SUGGS.

Witnesses:
 JNO. R. DAIL,
 W. H. HOLMES.

Copies of this patent may be obtained for five cents each, by addressing the "Commissioner of Patents, Washington, D. C."